Feb. 28, 1939.  H. E. BRANDT  2,148,726
DUPLEX NOZZLE FOR SPRAYERS
Filed Nov. 17, 1937

Inventor
HENRY E. BRANDT
By Chas. E. Rey.
Attorney

Patented Feb. 28, 1939

2,148,726

UNITED STATES PATENT OFFICE 2,148,726

DUPLEX NOZZLE FOR SPRAYERS

Henry E. Brandt, St. Paul, Minn., assignor to Dobbins Manufacturing Company, St. Paul, Minn., a corporation of Minnesota Application November 17, 1937, Serial No. 175,066

6 Claims. (Cl. 43—148)

This invention relates to a nozzle or discharge head for spraying or discharging insecticide material. While the invention might be useful for various materials of a fluid or liquid nature it particularly is designed for spraying dust or powder. Various insecticides are now commonly sprayed on vegetation in the form of dust. With certain types of sprayers for spraying certain plants it has been the custom to have a nozzle with discharge holes in its end for spraying the tops of the leaves and to have another nozzle used interchangeably with the first mentioned nozzle having an opening in its side by means of which the undersurface of the leaves could be sprayed.

It is an object of this invention to provide a nozzle or discharge device by means of which both the tops and bottoms of the leaves can be sprayed without changing nozzles.

It is another object of the invention to provide a discharge device having an end wall with means through which the material is sprayed and having a side wall with means through which the material may be sprayed together with means for rendering one of said means operative and simultaneously rendering the other inoperative.

It is a further object of the invention to provide a nozzle having an end wall and a substantially cylindrical side wall, said end wall having one or more discharge openings therethrough and said side wall having a discharge slot extending therethrough together with means for closing said opening or openings in said end wall when said slot is opened and for closing said slot when said opening or openings in said end wall are open.

These and other objects and advantages of the invention will be fully set forth in the following description made in connection with the accompanying drawing in which like reference characters refer to similar parts throughout the several views in which.

Figure 1:
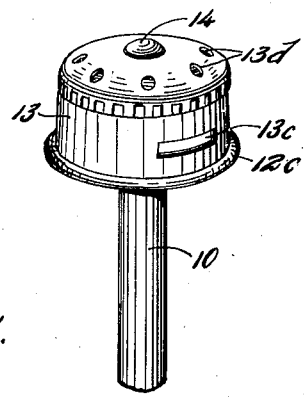
Fig. 1 is a perspective view of the nozzle and discharge pipe connected thereto.
Figure 5:
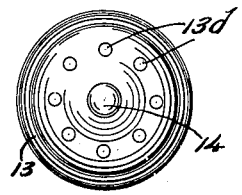
Fig. 5 is a plan view showing the parts in a different position than shown in Fig. 3.
Figure 3:
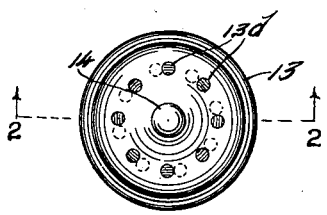
Fig. 3 is a top plan view of the nozzle.
Figure 4:
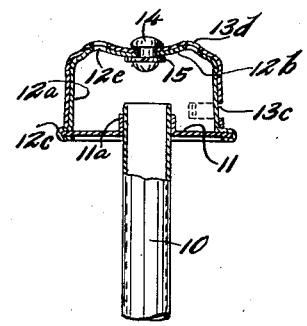
Fig. 4 is a view similar to Fig. 2 showing the parts in a different position.

Referring to the drawing a device is shown comprising a supply pipe or tube 10. This tube has secured thereto adjacent its end a circular plate 11 having a cylindrical hub 11a fitting about tube 10 and secured thereto in any suitable manner as by soldering or brazing. A shell 12 having a cylindrical wall 12a and an end wall 12b is provided, said end wall extending substantially transversely of said cylindrical wall. Said cylindrical wall 12a at the end opposite said end wall has a bead 12c formed thereon which extends about and embraces the edge of plate 11. Plate 11 will be rigidly secured to the bead 12c and thus the shell 12 in any suitable manner so that a tight joint is formed. Shell 12 also has a slot 12d of comparatively narrow width extending circumferentially of its wall 12a and parallel to plate 11. Said shell 12 also has a plurality of circumferentially spaced holes 12e through the end wall 12b, said holes being equi-distant from the central axis of said shell. As shown, end wall 12b has a central depression concave on its upper side and extends to side wall 12a in a compound curve. A second shell 13 is provided having an end wall 13a and a cylindrical side wall 13b fitting closely to end wall 12b and side wall 12a respectively. Shells 12 and 13 are connected by a headed rivet 14, the same having a spring washer 15 under the head thereof at the inner side of the shell 12. Shell 13 is connected so as to be revoluble about shell 12. Shell 13 also has a slot 13c formed therein arranged to register or align with slot 12d in a certain position of shell 13 but also adapted to be moved out of alignment with slot 12d. Shell 12 has a small lug 12f formed thereon which projects through slot 12c and forms a stop limiting the revoluble movement of shell 13. Shell 13 also has a plurality of holes 13d through its end wall which holes are arranged to align with or register with the holes 12e when slots 12d and 13c are out of alignment. Conversely, it will be seen that when shell 13 is rotated to bring slots 12d and 13c to alignment that holes 13d will be out of alignment with holes 12e.

Figure 2:
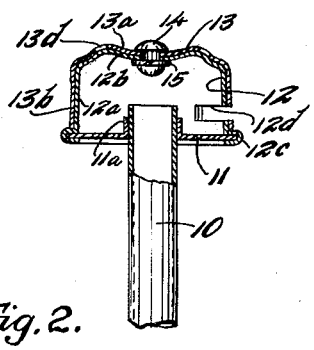
Fig. 2 is a view taken on line 2—2 of Fig. 3 as indicated by the arrows, part of the discharge pipe being shown in side elevation.
Figure 6:
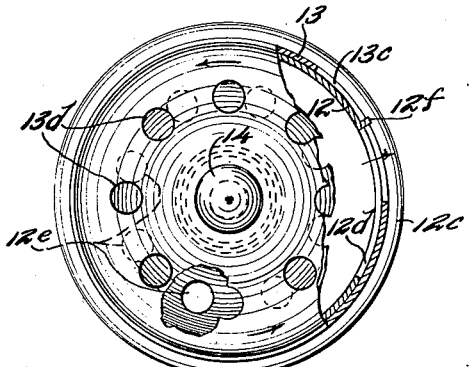
Fig. 6 is a view partly in plan and partly in horizontal section, some parts being broken away, said view being shown on an enlarged scale.

In the use of the device the tube 10 which is usually of considerable length so as to reach down to the plants will be supplied to a chamber in the sprayer from which dust is blown through tube 10 and into shell 12. Shell 13 can, as stated, be turned to position with slots 12d and 13c in register or alignment as shown in Figs. 1 and 2. The operator then places the nozzle down under the leaves and the dust is blown in a shower out through said aligned slots so as to engage the undersurfaces of the leaves. At this time the holes through the end wall of the nozzle are closed. When it is desirable to spray the tops of the leaves shell 13 will be rotated to position to bring holes 13d and 12e into alignment and the insecticide will then be discharged through these holes. The slots 12d and 13c will be out of alignment and thus no material can be discharged through the side wall of the nozzle. The shells will have a sufficiently close fit and have sufficient friction due to washer 15 so that shell 13 will remain in the position to which it is moved.

From the above description it is seen that applicant has provided a very simple and efficient structure of nozzle and one with which it will not be necessary to change nozzles to spray the tops and bottoms of the leaves. It will only be necessary to merely rotate the outer shell 13 to the proper position to place the nozzles in the desired spraying condition. The nozzle thus has a double function and much time is saved in eliminating the changing of nozzles. The device has been amply demonstrated in actual practice and is being commercially made.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:

1. A discharge nozzle for spraying insecticide material comprising a shell having a substantially cylindrical wall and a top side extending transversely of said wall, said wall having a narrow opening therethrough extending circumferentially thereof and said top side having a spray opening therethrough and means for closing one of said openings and simultaneously opening the other.

2. A discharge nozzle for spraying insecticide material comprising a shell having an end wall and a side wall, said shell having means for discharging said material through said end wall and means for discharging said material through said side wall and means for rendering one of said means operative and simultaneously rendering the other inoperative.

3. A discharge nozzle for spraying insecticide material comprising a shell having an end wall and a substantially cylindrical side wall, a circumferentially extending slot in said side wall, a plurality of holes in said end wall and means for closing said slot while said holes are open and for closing said holes while said slot is open.

4. A discharge nozzle for spraying insecticide material comprising a stationary shell having an end wall and a substantially cylindrical side wall, said shell having a circumferentially extending slot in its cylindrical wall and a plurality of holes in said end wall, a second shell fitting about and movable relatively to said first mentioned shell having a slot therein and holes therethrough, said latter holes being arranged to register with said first mentioned holes when said slots are out of register and said slots being arranged to register when said holes are out of register.

5. A discharge device for spraying insecticide material comprising a container from which material is adapted to be discharged, said container having spaced openings through which material may be discharged therefrom in directions substantially at right angles to each other and means for closing one of said openings and simultaneously opening the other.

6. A discharge nozzle for spraying insecticide material comprising a shell having an end wall and a side wall, said shell having an opening in said end wall for discharging material therefrom and having an opening in said side wall for discharging material therethrough and means for having either of said openings closed while the other is open.

HENRY E. BRANDT.